(12) United States Patent
Cho et al.

(10) Patent No.: US 12,278,375 B2
(45) Date of Patent: Apr. 15, 2025

(54) LITHIUM SECONDARY BATTERY ELECTRODE COMPRISING LIOH, MANUFACTURING METHOD THEREFOR, AND LITHIUM SECONDARY BATTERY COMPRISING ELECTRODE

(71) Applicant: LG CHEM, LTD., Seoul (KR)

(72) Inventors: Eunkyung Cho, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 895 days.

(21) Appl. No.: 17/044,653

(22) PCT Filed: Sep. 17, 2019

(86) PCT No.: PCT/KR2019/011955
§ 371 (c)(1),
(2) Date: Oct. 1, 2020

(87) PCT Pub. No.: WO2020/060131
PCT Pub. Date: Mar. 26, 2020

(65) Prior Publication Data
US 2021/0098792 A1    Apr. 1, 2021

(30) Foreign Application Priority Data

Sep. 19, 2018 (KR) .................. 10-2018-0111952
Sep. 16, 2019 (KR) .................. 10-2019-0113731

(51) Int. Cl.
*H01M 4/136* (2010.01)
*H01M 4/04* (2006.01)
(Continued)

(52) U.S. Cl.
CPC ......... *H01M 4/628* (2013.01); *H01M 4/0404* (2013.01); *H01M 4/0416* (2013.01);
(Continued)

(58) Field of Classification Search
None
See application file for complete search history.

(56) References Cited

U.S. PATENT DOCUMENTS

2010/0297510 A1   11/2010   Kim et al.
2013/0022873 A1*   1/2013   von Bulow ........... H01M 4/505
                                                          977/734
(Continued)

FOREIGN PATENT DOCUMENTS

CN    106489217 A    3/2017
CN    107221704 A    9/2017
(Continued)

OTHER PUBLICATIONS

English translation of KR 2016/0038984 (Year: 2016).*
(Continued)

*Primary Examiner* — Yoshitoshi Takeuchi
(74) *Attorney, Agent, or Firm* — Birch, Stewart, Kolasch & Birch, LLP (57) ABSTRACT

An electrode for a lithium secondary battery including LiOH, a method of manufacturing the same, and a lithium secondary battery including said electrode are provided. The electrode for a lithium secondary battery including LiOH is such that a SEI film is efficiently formed on the electrode surface.

3 Claims, 2 Drawing Sheets

(51) Int. Cl.
*H01M 4/133* (2010.01)
*H01M 4/1393* (2010.01)
*H01M 4/36* (2006.01)
*H01M 4/38* (2006.01)
*H01M 4/587* (2010.01)
*H01M 4/62* (2006.01)
*H01M 10/052* (2010.01)
*H01M 4/02* (2006.01)

(52) U.S. Cl.
CPC ......... *H01M 4/133* (2013.01); *H01M 4/1393* (2013.01); *H01M 4/364* (2013.01); *H01M 4/366* (2013.01); *H01M 4/38* (2013.01); *H01M 4/587* (2013.01); *H01M 10/052* (2013.01); *H01M 2004/028* (2013.01)

(56) References Cited

U.S. PATENT DOCUMENTS

| | | | |
|---|---|---|---|
| 2013/0295464 A1 | 11/2013 | Yanagi et al. | |
| 2015/0072248 A1 | 3/2015 | Watanabe et al. | |
| 2015/0280218 A1* | 10/2015 | Zimmerman | H01G 11/86 252/511 |
| 2018/0019465 A1* | 1/2018 | Kim | H01M 4/625 |
| 2018/0138503 A1* | 5/2018 | Kim | H01M 4/587 |
| 2018/0358611 A1* | 12/2018 | Kimura | H01M 10/0566 |
| 2019/0027321 A1 | 1/2019 | Kusuzaka et al. | |
| 2019/0123377 A1 | 4/2019 | Yang et al. | |
| 2019/0245203 A1 | 8/2019 | Cho et al. | |
| 2020/0235394 A1 | 7/2020 | Lee et al. | |

FOREIGN PATENT DOCUMENTS

| | | | | |
|---|---|---|---|---|
| CN | 107431199 A | | 12/2017 | |
| JP | 2000/208148 | * | 7/2000 | ............ H01M 10/05 |
| JP | 2000-208148 A | | 7/2000 | |
| JP | 2014-41710 A | | 3/2014 | |
| JP | 2015-503189 A | | 1/2015 | |
| JP | 2018-511923 A | | 4/2018 | |
| KR | 10-2014-0127886 A | | 11/2014 | |
| KR | 10-2016-0038984 A | | 4/2016 | |
| KR | 2016/0038984 | * | 4/2016 | ............ C01D 15/00 |
| KR | 10-2016-0143711 A | | 12/2016 | |
| KR | 10-2017-0032190 A | | 3/2017 | |
| KR | 10-2017-0035817 A | | 3/2017 | |
| KR | 2017/0032190 | * | 3/2017 | ............ H01M 4/136 |
| KR | 10-2018-0017796 A | | 2/2018 | |
| KR | 10-2018-0017975 A | | 2/2018 | |
| KR | 10-2018-0048309 A | | 5/2018 | |
| WO | WO 2010/058993 A2 | | 5/2010 | |
| WO | WO 2012/102037 A1 | | 8/2012 | |
| WO | WO 2013/074772 A1 | | 5/2013 | |
| WO | WO 2015/153729 A | | 10/2015 | |
| WO | WO 2017/099001 A1 | | 6/2017 | |
| WO | WO 2017/126698 A1 | | 7/2017 | |
| WO | WO 2018/164413 A1 | | 9/2018 | |

OTHER PUBLICATIONS

English translation of JP 2000/208148 (Year: 2000).*
Extended European Search Report for European Application No. 19863761.3, dated May 18, 2021.
Dressel et al., "Electrochemical performance of lithium-sulfur batteries based on a sulfur cathode obtained by H2S gas treatment of a lithium salt," Journal of Power Sources, vol. 307, 2016, pp. 844-848.
International Search Report (PCT/ISA/210) issued in PCT/KR2019/011955, dated Dec. 26, 2019.
Megahed et al., "Lithium-ion rechargeable batteries," Journal of Power Sources, vol. 51, 1994, pp. 79-104.
Mori et al., "Chemical properties of various organic electrolytes for lithium rechargeable batteries: 1. Characterization of passivating layer formed on graphite in alkyl carbonate solutions," Journal of Power Sources, vol. 68, 1997, pp. 59-64.
Wu et al., "The effect of water-containing electrolyte on lithium-sulfur batteries," Journal of Power Sources, vol. 369, pp. 50-56.

* cited by examiner

LITHIUM SECONDARY BATTERY ELECTRODE COMPRISING LIOH, MANUFACTURING METHOD THEREFOR, AND LITHIUM SECONDARY BATTERY COMPRISING ELECTRODE

TECHNICAL FIELD

The present application claims the benefits of priorities based on Korean Patent Application No. 10-2018-0111952 filed on Sep. 19, 2018 and Korean Patent Application No. 10-2019-0113731 filed on Sep. 16, 2019, the entire contents of which are incorporated herein by reference.

The present invention provides an electrode for a lithium secondary battery containing LiOH, a method of manufacturing the same, and a lithium secondary battery comprising said electrode.

BACKGROUND ART

As the application of energy storage technology extends to mobile phones, tablets, laptops, and camcorders, and further to electric vehicles (EVs) and hybrid electric vehicles (HEVs), research and development of electrochemical devices for energy storage are being actively conducted. In particular, a lithium secondary battery is widely used because it has a high energy density and voltage, a long cycle lifetime, and a low self-discharging rate.

In general, in a lithium secondary battery, lithium ions from lithium or lithium metal oxide which is used as a positive electrode move to the negative electrode during initial charging and thus are inserted between the layers of the negative electrode. At this time, since lithium is highly reactive, electrolyte solution and lithium salt react on the surface of the negative electrode, into which lithium is inserted, to generate compounds such as $Li_2CO_3$, $Li_2O$, and LiOH. These compounds form a kind of passivation layer on the surface of the negative electrode, which is called a solid electrolyte interface (SEI) film.

Once the SEI film is formed, it functions as an ion tunnel to pass only lithium ions, and the lithium ions again do not participate in side reactions with negative electrodes or other materials, and the amount of charge consumed by the formation of the SEI film is irreversible capacity, which has a characteristic of not reversibly reacting during discharging. Therefore, no further decomposition of the electrolyte solution occurs and the amount of lithium ions in the electrolyte solution is reversibly maintained to maintain stable charging and discharging (J. Power Sources (1994) 51: 79~104). As a result, once the SEI film is formed, the amount of lithium ions is reversibly maintained and the lifetime characteristics of the battery are also improved.

Meanwhile, a lithium-sulfur (Li—S) battery, which is being researched as a next-generation battery that can replace a conventional lithium ion battery because of high energy density, undergoes a reduction reaction of sulfur and an oxidation reaction of lithium metal during discharging. At this time, sulfur forms linear lithium polysulfides ($Li_2S_2$, $Li_2S_4$, $Li_2S_6$, $Li_2S_8$) from $S_8$ of the ring structure. The lithium-sulfur battery has a characteristic of indicating a stepwise discharge voltage until the polysulfide (PS) is completely reduced to $Li_2S$. Even in lithium-sulfur batteries, the SEI film provides desirable effects on battery characteristics.

The property of the SEI film depends on the type of solvent or the properties of the additives contained in the electrolyte solution, and is known as one of the major factors that affect the ion and charge transfer, resulting in a change in battery performance (See, Shoichiro Mori, Chemical properties of various organic electrolytes for lithium rechargeable batteries, J. Power Source (1997) Vol. 68).

Until now, as a method of forming an SEI film on the surface of an electrode, a method of forming the SEI film by adding an additive that can contribute to forming the SEI film to the electrolyte solution is known.

However, there is a need for a method for forming the SEI film having excellent characteristics on the positive electrode or the negative electrode of a lithium secondary battery more efficiently than the above method.

PRIOR ART DOCUMENT

Patent Document

PCT International Publication No. WO/2010/058993

DISCLOSURE

Technical Problem

As a result of studying the method of forming an SEI film effectively on the surface of an electrode for a lithium secondary battery, the present inventors have found that the SEI film is easily formed on the surface of an electrode if the electrode contains LiOH together with an active material, thereby completing the present invention.

Therefore, it is an object of the present invention to provide an electrode for a lithium secondary battery containing LiOH, and a lithium secondary battery comprising the electrode, which can efficiently form an SEI film on the surface.

In addition, the present invention provides a method of manufacturing an electrode for a lithium secondary battery containing LiOH capable of efficiently manufacturing the electrode.

Technical Solution

In order to achieve the above objects, the present invention provides an electrode for a lithium secondary battery containing LiOH.

In one embodiment of the present invention, LiOH may be comprised in an amount of more than 0 to 15 parts by weight based on 100 parts by weight of the active material.

In addition, the present invention provides a lithium secondary battery comprising the electrode.

In addition, the present invention provides a method for manufacturing an electrode for a lithium secondary battery containing LiOH comprising the steps of:
  (a) impregnating or coating the LiOH solution into or on the active material or mixing the LiOH powder with the active material;
  (b) preparing a slurry composition comprising the impregnated or coated active material or the mixed active material in step (a); an electrically conductive agent; and a binder; and
  (c) applying the prepared slurry onto a current collector.

In addition, the present invention provides a method for manufacturing a positive electrode for a lithium-sulfur battery containing LiOH comprising the steps of:
  (a) impregnating or coating LiOH into or on the carbon-based material or mixing the LiOH powder with the carbon-based material;

(b) mixing the LiOH-impregnated or coated carbon-based material or the carbon-based material mixed with the LiOH powder prepared in step (a) with sulfur;
(c) heat-treating the mixture of the carbon-based material and sulfur to prepare a sulfur-carbon composite;
(d) preparing a slurry composition comprising the sulfur-carbon composite prepared in step (c); an electrically conductive material; and a binder; and
(e) applying the prepared slurry onto a current collector.

Advantageous Effects

The electrode for a lithium secondary battery containing LiOH according to the present invention provides an effect of efficiently forming an SEI film on the surface.

In addition, the lithium secondary battery of the present invention provides excellent operating characteristics and lifetime characteristics by including the electrode.

In addition, the method of manufacturing an electrode for a lithium secondary battery containing LiOH of the present invention provides a method of manufacturing an electrode for a lithium secondary battery containing LiOH very efficiently.

BEST MODE

Hereinafter, exemplary embodiments of the present invention will be described in detail with reference to the accompanying drawings so that those skilled in the art may easily implement the present invention. However, the present invention can be implemented in many different forms and is not limited to the embodiments described herein.

The present invention relates to an electrode for a lithium secondary battery containing LiOH.

LiOH may be contained in an amount of more than 0 to 15 parts by weight, preferably 0.012 to 10 parts by weight, more preferably 0.12 to 10 parts by weight, even more preferably 0.15 to 5 parts by weight, based on 100 parts by weight of active material.

In the above case, when LiOH exceeds 15 parts by weight, the effect of promoting the formation of the SEI film no longer increases, whereas it is not preferable because it results in reducing the content of the active material.

LiOH may be present in the form of being impregnated into or coated on the active material or mixed with the active material.

The electrode may be a positive electrode or a negative electrode. In other words, in a lithium ion battery, the SEI film may be required for the positive electrode or negative electrode depending on the type of battery. Therefore, LiOH in the present invention can be used with a negative electrode active material or a positive electrode active material.

In the present invention, when the lithium secondary battery is a Li—S battery, the electrode for the lithium secondary battery containing the LiOH may be a positive electrode. In this case, the positive electrode may include a sulfur-carbon composite active material.

In the sulfur-carbon composite active material, LiOH may be impregnated into or coated on a carbon-based material, but is not limited thereto, and LiOH may be comprised in a form mixed with a carbon-based material and sulfur or a sulfur compound.

If the lithium secondary battery comprises a positive electrode comprising lithium, the electrode for the lithium secondary battery containing LiOH may be a negative electrode, wherein the negative electrode may comprise a carbon-based material.

The carbon-based material may be comprised in a form impregnated or coated with LiOH, and may also be comprised in a mixed form with LiOH, but is not limited thereto.

In the above, the carbon-based material may be, but is not limited to, at least one selected from the group consisting of graphite, carbon nanotubes, graphene, graphite, amorphous carbon, carbon black, and activated carbon.

In addition, the present invention relates to a method of manufacturing an electrode for a lithium secondary battery containing LiOH comprising the steps of:
(a) impregnating or coating the LiOH solution into or on the active material or mixing the LiOH powder with the active material;
(b) preparing a slurry composition comprising the impregnated or coated active material or the mixed active material in step (a); an electrically conductive agent; and a binder; and
(c) applying the prepared slurry onto a current collector.

In the manufacturing method, the contents of the above-described electrode for a lithium secondary battery containing LiOH may be applied as it is.

As for the impregnation, coating, and mixing methods in step (a); components and composition ratios of the slurry composition in step (b); and the current collector and the method of applying the slurry in the step (c), methods known in the art may be applied as they are.

In step (a), water or an organic solvent or a mixture thereof may be used as a solvent in the LiOH solution, but it may be more preferable to use water as the solvent, at the point that the impregnation can easily proceed by dissolving LiOH.

The organic solvent is not particularly limited as long as it can dissolve LiOH and vaporize without decomposing carbon.

Between step (a) and step (b), a step of drying the impregnated or coated active material, or mixed active material in step (a) may be further comprised.

In step (a), the active material may be a carbon-based material, and may be a material further containing sulfur or a sulfur compound together with a carbon-based material, for example, a sulfur-carbon composite.

In addition, the present invention relates to a method of manufacturing a positive electrode for a lithium-sulfur battery containing LiOH comprising the steps of:
(a) impregnating or coating LiOH into or on the carbon-based material or mixing the LiOH powder with the carbon-based material;
(b) mixing the LiOH-impregnated or coated carbon-based material or the carbon-based material mixed with the LiOH powder prepared in step (a) with sulfur;
(c) heat-treating the mixture of the carbon-based material and sulfur to prepare a sulfur-carbon composite;
(d) preparing a slurry composition containing the sulfur-carbon composite prepared in step (c); an electrically conductive material; and a binder; and (e) applying the prepared slurry onto a current collector.

As for the impregnation, coating, and mixing method in step (a); heat-treatment method in step (c); components and composition ratios of the slurry composition in step (d); and the current collector and the method of applying the slurry in the step (e), methods known in the art may be applied as they are.

In step (a), the impregnation or the coating of LiOH can be carried out using LiOH solution, and water or an organic solvent or a mixture thereof may be used as a solvent, but it may be more preferable to use water as the solvent, at the point that the impregnation or the coating can easily proceed by dissolving LiOH.

The organic solvent is not particularly limited as long as it can dissolve LiOH and vaporize without decomposing carbon.

Between step (a) and step (b), a step of drying the impregnated or coated active material, or mixed active material in step (a) may be further comprised.

The heat-treatment in step (c) may be performed at a temperature of 120 to 200° C., but is not limited thereto.

In addition, the present invention relates to a lithium secondary battery comprising an electrode for a lithium secondary battery containing LiOH.

Although the type of the battery is not particularly limited, the lithium-sulfur battery is representative.

Hereinafter, the present invention will be described in more detail through a lithium-sulfur battery. However, the present invention is not limited to the lithium-sulfur battery.

Sulfur-Carbon Composite Containing LiOH

The sulfur-carbon composite containing LiOH of the present invention comprises sulfur which is a non-conductive material and a carbon-based material which has electrical conductivity, thereby being used as a positive electrode active material for a lithium-sulfur battery.

The sulfur-carbon composite containing LiOH may be prepared by first impregnating and coating LiOH on a carbon-based material, or mixing LiOH and a carbon-based material and then adding sulfur. However, the present invention is not limited thereto, and the sulfur-carbon composite may be prepared first, and then LiOH may be added in the same manner as described above.

In the case of the lithium-sulfur battery, during the discharging, as the S—S bond of sulfur-based compounds is cut off, the oxidation number of S decreases, and during the charging, as the S—S bond is re-formed, the oxidation number of S increases. The electrical energy is generated by this oxidation-reaction reaction.

The carbon-based material that can be used in the sulfur-carbon composite of the present invention may be one that can impart conductivity to sulfur which is an insulator. Specifically, the carbon-based material may be at least one selected from the group consisting of carbon nanotubes, graphene, graphite, amorphous carbon, carbon black, activated carbon, and the like. Among these, carbon nanotubes, graphite, and carbon black are more preferable in terms of excellent electrical conductivity, specific surface area, and capacity for supporting sulfur.

The carbon nanotubes (CNT) may be single-walled carbon nanotubes (SWCNT) or multi-walled carbon nanotubes (MWCNT). It is preferable that the diameter of the said CNT is 1 to 200 nm, it is more preferable that the diameter of the said CNT is 1 to 100 nm, and it is most preferable that the diameter of the said CNT is 1 to 50 nm. If the diameter of the CNT exceeds 200 nm, there is a problem that the specific surface area is reduced and thus the reaction area with the electrolyte solution is reduced.

The graphite may be at least one of artificial graphite and natural graphite. The natural graphite comprises flake graphite, high crystalline graphite, and microcrystalline (microcrystalline or cryptocrystalline; amorphous) graphite. The artificial graphite comprises primary or electrographite, secondary graphite, graphite fiber, and the like. The graphite particles may be used alone or in combination of two or more kinds of the above-described graphite type.

The carbon black may be, for example, at least one selected from the group consisting of acetylene black, Ketjen black, furnace black, oil-furnace black, Columbia carbon, channel black, lamp black, and thermal black. The particle size of the carbon black is not limited, but the average particle diameter is preferably 0.01 to 0.5 μm in terms of securing the reaction area with the electrolyte solution.

As the sulfur, inorganic sulfur or elemental sulfur ($S_8$) may be preferably used.

In the sulfur-carbon composite according to the present invention, the carbon-based material and sulfur are preferably mixed in a weight ratio of 1:1 to 1:9. If the content of the carbon-based material exceeds the above range, the content of sulfur, which is an active material, is lowered, causing problems in securing battery capacity. If the content of the carbon-based material is less than the above range, the content of the carbon-based material is insufficient to impart electrical conductivity. Therefore, the content of the carbon-based material is properly adjusted within the above range.

The complexing method of the sulfur-carbon composite of the present invention is not particularly limited in the present invention and a method commonly used in the art may be used.

The sulfur-carbon composite proposed in the present invention may be complexed by simple mixing of sulfur and a carbon-based material or may have a coating form or a supporting form of a core-shell structure. The form of the coating of the core-shell structure is a form in which any one of sulfur and carbon-based materials is coated with the other one, and for example, a form in which the surface of the carbon-based material may be wrapped by sulfur or vice versa. In addition, if the carbon-based material is porous, the supported form may be a form in which sulfur is supported inside the carbon-based material. The form of the sulfur-carbon composite may be used in any form as long as it satisfies the content ratio of sulfur and carbon-based material as described above.

The diameter of the sulfur-carbon composite is not particularly limited in the present invention, but may vary, preferably 0.1 to 20 um, more preferably 1 to 10 um. When satisfying the above range, there is an advantage of being able to manufacture a high loading electrode.

Electrode for Lithium-Sulfur Battery

The electrode for the lithium-sulfur battery includes sulfur-carbon composite as an active material containing LiOH. The electrode for a lithium-sulfur battery includes an active material layer formed on a current collector, and the active material layer includes a sulfur-carbon composite containing LiOH of the present invention, an electrically conductive material, a binder, and other additives.

The electrode current collector serves to transfer electrons from the outside to cause an electrochemical reaction in the active material, or serves as a passage for receiving electrons from the active material and flowing them to the outside, and is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used. In addition, the electrode current collector can have minute irregularities formed on its surface to enhance the bonding force with the active material, and may be formed in various forms such as film, sheet, foil, net, porous body, foam, nonwoven fabric or the like.

The electrically conductive material is not particularly limited as long as it is electrically conductive without causing chemical changes in the battery. Examples of the electrically conductive material may comprise graphite such as natural graphite and artificial graphite; carbon blacks such as carbon black, acetylene black, Ketjen black, Denka black, channel black, furnace black, lamp black, and thermal black; graphene; carbon fibers such as carbon nanotubes (CNT) and carbon nanofibers (CNF), or electrically conductive fibers such as metal fibers; metal powders such as carbon fluoride powder, aluminum powder and nickel powder; electrically conductive whiskers such as zinc oxide and potassium titanate; electrically conductive metal oxides such as titanium oxide; polyphenylene derivatives and the like.

The binder is added for bonding of the active material and the electrically conductive material and for bonding of the active material and the current collector. The binders may comprise thermoplastic resins or thermosetting resins. As a binder, for example, polyethylene, polypropylene, polytetrafluoro ethylene (PTFE), polyvinylidene fluoride (PVDF), styrene-butadiene rubber (SBR), tetrafluoroethylene-perfluoro alkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoro ethylene copolymer and ethylene-acrylic copolymer, etc. can be used alone or in combination, but it is not necessarily limited to these and any one that can be used as a binder in the art can be used.

The electrode for the lithium-sulfur battery of the present invention can be produced by the conventional method. Specifically, the electrode is prepared by applying a slurry composition prepared by mixing the sulfur-carbon composite comprising LiOH of the present invention, which is an active material, the electrically conductive material, and the binder in an organic solvent, on the current collector, drying it, and optionally compressing and molding it onto the current collector for the purpose of improving the density of the electrode. At this time, as the organic solvent, it is preferable to use an organic solvent which can uniformly disperse the positive electrode active material, the binder, and the electrically conductive material, and is easily evaporated. Specifically, N-methyl-2-pyrrolidone, acetonitrile, methanol, ethanol, tetrahydrofuran, water, isopropyl alcohol and the like may be comprised.

Lithium-Sulfur Battery

The lithium-sulfur battery according to the present invention comprises a positive electrode and a negative electrode, and an electrolyte solution present between them, wherein the positive electrode is an electrode for a lithium-sulfur battery according to the present invention. In this case, the battery may further comprise a separator interposed between the positive electrode and the negative electrode.

The configuration of the negative electrode, the separator, and the electrolyte solution of the lithium-sulfur battery is not particularly limited in the present invention, and is as known in the art.

Negative Electrode

The negative electrode according to the present invention includes a negative electrode active material formed on the negative electrode current collector.

The negative electrode current collector may be specifically selected from the group consisting of copper, stainless steel, titanium, silver, palladium, nickel, alloys thereof, and combinations thereof. The stainless steel can be surface-treated with carbon, nickel, titanium, or silver, and the alloy may be an aluminum-cadmium alloy. In addition to these, sintered carbon, a nonconductive polymer the surface of which is treated with an electrically conductive material, or an electrically conductive polymer, etc. may be used.

The negative electrode active material may comprise a material capable of reversibly intercalating or deintercalating lithium ion ($Li^+$), a material capable of reacting with lithium ion to reversibly form lithium containing compounds, lithium metal, or lithium alloy. The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The negative electrode may further include a binder for bonding of the negative electrode active material and the electrically conductive material and for bonding to the current collector. Specifically, the binder is the same as described above for the binder of the positive electrode.

Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Separator

The conventional separator can be interposed between the positive electrode and the negative electrode. The separator is a physical separator having a function of physically separating electrodes. Any separator can be used without any particular limitations as long as it is used as a conventional separator. Particularly, a separator with excellent humidification ability for the electrolyte solution while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of porous and nonconductive or insulating material. The separator may be an independent member such as a film, or may be a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

Electrolyte

The electrolyte solution according to the present invention may be a non-aqueous electrolyte solution containing lithium salt, an organic solid electrolyte, and an inorganic solid electrolyte, etc., wherein the non-aqueous electrolyte solution is composed of lithium salt and a solvent, wherein the solvent may be a non-aqueous organic solvent.

The lithium salt is a substance which can be easily dissolved in a non-aqueous organic solvent, and for example, may be at least one selected from the group consisting of LiCl, LiBr, LiI, LiClO$_4$, LiBF$_4$, LiB$_{10}$Cl$_{10}$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$FsSO$_2$)$_2$, LiN(SO$_2$F)$_2$, lithium chloroborane, lithium lower aliphatic carboxylate, lithium tetraphenyl borate, and lithium imide.

The concentration of the lithium salt may be 0.1 to 4.0 M, preferably 0.5 to 2.0 M depending on various factors such as the exact composition of the electrolyte mixture, the solubility of the salt, the conductivity of the dissolved salt, the charging and discharging conditions of the battery, the operating temperature, and other factors known in the lithium-sulfur battery field. If the concentration of the lithium salt is less than the above range, the conductivity of the electrolyte solution may be lowered and thus the performance of the electrolyte may be deteriorated. If the concentration of the lithium salt exceeds the above range, the viscosity of the electrolyte solution may be increased and thus the mobility of the lithium ion (Li$^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, tetraethyleneglycol dimethylether, tetrahydroxy furan, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate can be used alone or in a mixed solvent form of two or more solvents thereof.

As the organic solid electrolyte, preferably, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers including ionic dissociation groups and the like can be used.

As the inorganic solid electrolyte of the present invention, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$-Li$_2$S—SiS$_2$ may be preferably used.

The non-aqueous electrolyte solution for the lithium-sulfur battery of the present invention may further comprise nitric acid or nitrous acid-based compounds as an additive. The nitric acid or nitrous acid-based compounds have an effect of forming a stable coating on the lithium electrode and improving the charging/discharging efficiency. The nitric acid or nitrous acid-based compounds may be, but are not limited to, at least one selected from the group consisting of inorganic nitric acid or nitrous acid compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), and ammonium nitrite (NH$_4$NO$_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate is used.

In addition, the non-aqueous electrolyte solution may further comprise other additives for the purpose of improving charging/discharging characteristics, flame retardancy, and the like. Examples of the additives may comprise pyridine, triethylphosphite, triethanolamine, cyclic ether, ethylene diamine, n-glyme, hexaphosphoric triamide, nitrobenzene derivatives, sulfur, quinoneimine dyes, N-substituted oxazolidinone, N, N-substituted imidazolidine, ethylene glycol dialkyl ether, ammonium salt, pyrrole, 2-methoxy ethanol, aluminum trichloride, fluoroethylene carbonate (FEC), propen sultone (PRS), vinylene carbonate (VC) and the like.

The positive electrode, the negative electrode, and the separator comprised in the lithium-sulfur battery can be prepared according to the common component and preparation method, respectively, and also the appearance of the lithium-sulfur battery is not particularly limited, but may be a cylindrical shape, a square shape, a pouch shape, or a coin shape.

Although the present invention has been described above with reference to the lithium-sulfur battery, the present invention is not limited to the lithium-sulfur battery, and may be equally applicable to a general lithium secondary battery. In addition, when applied to a general lithium secondary battery, the present invention can be applied according to a well-known technique unless specifically limited above.

Hereinafter, preferred examples are provided to help understanding of the present invention, but the following examples are merely for exemplifying the present invention, and it is apparent to those skilled in the art that various changes and modifications can be made within the scope and spirit of the present invention, and such changes and modifications are within the scope of the appended claims.

Preparation Example 1: Preparation of LiOH-Impregnated Sulfur-Carbon Composite Active Material After dissolving 4 mg of LiOH in 50 g of water to prepare an aqueous LiOH solution, it was impregnated into 9.996 g of carbon nanotubes (CNT) by an incipient wetness impregnation method. The impregnated CNT was dried in vacuo to remove water to prepare CNT impregnated with LiOH.

9 g of LiOH-impregnated CNT (containing 3.6 mg of LiOH) was mixed with 21 g of sulfur (S), placed in an oven, and heated at 155° C. for 30 minutes to prepare a LiOH-impregnated sulfur-carbon composite.

Preparation Example 2: Preparation of LiOH-Impregnated Sulfur-Carbon Composite Active Material After dissolving 10 mg of LiOH in 50 g of water to prepare an aqueous LiOH solution, it was impregnated into 9.990 g of carbon nanotubes (CNT) by an incipient wetness impregnation method. The impregnated CNT was dried in vacuo to remove water to prepare CNT impregnated with LiOH.

9 g of LiOH-impregnated CNT (containing 9 mg of LiOH) was mixed with 21 g of sulfur (S), placed in an oven, and heated at 155° C. for 30 minutes to prepare a LiOH-impregnated sulfur-carbon composite.

Preparation Example 3: Preparation of LiOH-Impregnated Sulfur-Carbon Composite Active Material After dissolving 20 mg of LiOH in 50 g of water to prepare an aqueous LiOH solution, it was impregnated into 9.980 g of carbon nanotubes (CNT) by an incipient wetness impregnation method. The impregnated CNT was dried in vacuo to remove water to prepare CNT impregnated with LiOH.

9 g of LiOH-impregnated CNT (containing 18 mg of LiOH) was mixed with 21 g of sulfur (S), placed in an oven, and heated at 155° C. for 30 minutes to prepare a LiOH-impregnated sulfur-carbon composite.

Preparation Example 4: Preparation of LiOH-Impregnated Sulfur-Carbon Composite Active Material After dissolving 50 mg of LiOH in 50 g of water to prepare an aqueous LiOH solution, it was impregnated into 9.950 g of carbon nanotubes (CNT) by an incipient wetness impregnation method. The impregnated CNT was dried in vacuo to remove water to prepare CNT impregnated with LiOH.

9 g of LiOH-impregnated CNT (containing 45 mg of LiOH) was mixed with 21 g of sulfur (S), placed in an oven, and heated at 155° C. for 30 minutes to prepare a LiOH-impregnated sulfur-carbon composite.

Preparation Example 5: Preparation of LiOH-Impregnated Sulfur-Carbon Composite Active Material After dissolving 0.5 g of LiOH in 50 g of water to prepare an aqueous LiOH solution, it was impregnated into 9.500 g of carbon nanotubes (CNT) by an incipient wetness impregnation method. The impregnated CNT was dried in vacuo to remove water to prepare CNT impregnated with LiOH.

9 g of LiOH-impregnated CNT (containing 450 mg of LiOH) was mixed with 21 g of sulfur (S), placed in an oven, and heated at 155° C. for 30 minutes to prepare a LiOH-impregnated sulfur-carbon composite.

Preparation Example 6: Preparation of LiOH-Impregnated Artificial Graphite Active Material After dissolving 50 mg of LiOH in 50 g of water to prepare an aqueous LiOH solution, it was impregnated into 9.950 g of artificial graphite by an incipient wetness impregnation method. The impregnated artificial graphite was dried in vacuo to remove water to prepare artificial graphite impregnated with LiOH.

Comparative Preparation Example 1: Preparation of Sulfur-Carbon Composite Active Material 9 g of carbon nanotubes (CNT) were mixed with 21 g of sulfur (S), placed in an oven, and heated at 155° C. for 30 minutes to prepare a sulfur-carbon composite.

Examples 1 to 5: Preparation of Positive Electrode for Lithium-Sulfur Battery Containing LiOH 88% by weight of the LiOH-impregnated sulfur-carbon composite prepared in Preparation Examples 1 to 5, 5% by weight of an electrically conductive material, and 7% by weight of a binder were mixed with distilled water to prepare a composition for forming an active material layer. The composition was coated on an aluminum current collector in an amount of 6 mg/cm$^2$ to prepare a conventional positive electrode.

Example 6: Preparation of Negative Electrode for Lithium Secondary Battery Containing LiOH 88% by weight of LiOH-impregnated artificial graphite prepared in Preparation Example 6, 5 wt. % of an electrically conductive material, and 7% by weight of a binder were mixed with distilled water to prepare a composition for forming an active material layer. The composition was coated on an aluminum current collector in an amount of 6 mg/cm$^2$ to prepare a conventional positive electrode.

Comparative Example 1: Preparation of Positive Electrode for Lithium-Sulfur Battery not Containing LiOH 88% by weight of LiOH-impregnated sulfur-carbon composite prepared in Comparative Preparation Example 1, 5 wt. % of an electrically conductive material, and 7% by weight of a binder were mixed with distilled water to prepare a composition for forming an active material layer. The composition was coated on an aluminum current collector in an amount of 6 mg/cm$^2$ to prepare a conventional positive electrode.

Examples 7-11: Manufacture of Lithium-Sulfur Battery

The positive electrode for a lithium-sulfur battery including LiOH of Examples 1 to 5 was punched according to the size of a coin cell, and then five coin cell batteries comprising it as a positive electrode were manufactured.

In the glove box under argon atmosphere, the coin cell was assembled by placing a positive electrode, a separator (polyethylene), a lithium negative electrode, a gasket, a stainless steel coin, spring, a top plate of the stainless steel sequentially on a lower plate of the stainless steel and applying pressure to them.

A mixed solution of 1,3-dioxolane (DOL), in which 1 M LiFSI and 1 wt. % LiNO$_3$ are dissolved, and diethylene glycol dimethyl ether (DEGDME) was injected as an electrolyte solution onto the punched positive electrode.

TABLE 1

| Lithium-sulfur battery | Positive electrode used |
|---|---|
| Example 7 battery | Example 1 manufacture: LiOH 0.012 part by weight relative to 100 parts by weight of active material |
| Example 8 battery | Example 2 manufacture: LiOH 0.03 part by weight relative to 100 parts by weight of active material |
| Example 9 battery | Example 3 manufacture: LiOH 0.06 part by weight relative to 100 parts by weight of active material |
| Example 10 battery | Example 4 manufacture: LiOH 0.15 part by weight relative to 100 parts by weight of active material |
| Example 11 battery | Example 5 manufacture: LiOH 1.5 part by weight relative to 100 parts by weight of active material |

Comparative Example 2: Manufacture of Lithium-Sulfur Battery

A lithium-sulfur battery was manufactured in the same manner as in Example 7, except that instead of using the positive electrode for lithium-sulfur battery containing LiOH of Example 1 in Example 7, the positive electrode for lithium-sulfur battery of Comparative Example 1 is used.

Example 12: Manufacture of Lithium Secondary Battery

The negative electrode (using artificial graphite) for lithium secondary battery including LiOH of Example 6 was punched according to the size of a coin cell, and then a coin cell battery comprising it as a negative electrode was manufactured.

In the glove box under argon atmosphere, the coin cell was assembled by placing a $LiCoO_2$ positive electrode, a separator (polyethylene), a negative electrode, a gasket, a stainless steel coin, spring, a top plate of the stainless steel sequentially on a lower plate of the stainless steel and applying pressure to them.

1.0M electrolyte solution, in which $LiPF_6$ is dissolved in EC:EMC (1:2 volume ratio), was injected as an electrolyte solution onto the punched positive electrode.

Experimental Example 1: Analysis of the Properties of LiOH Impregnated CNT

After impregnating LiOH in Preparation Examples 1 to 5, the decomposition temperatures of the dry CNT and LiOH impregnated CNTs were determined using a thermogravimetric analyzer (METALER-TOLEDO TGA/DSC 2).

Figure 1:
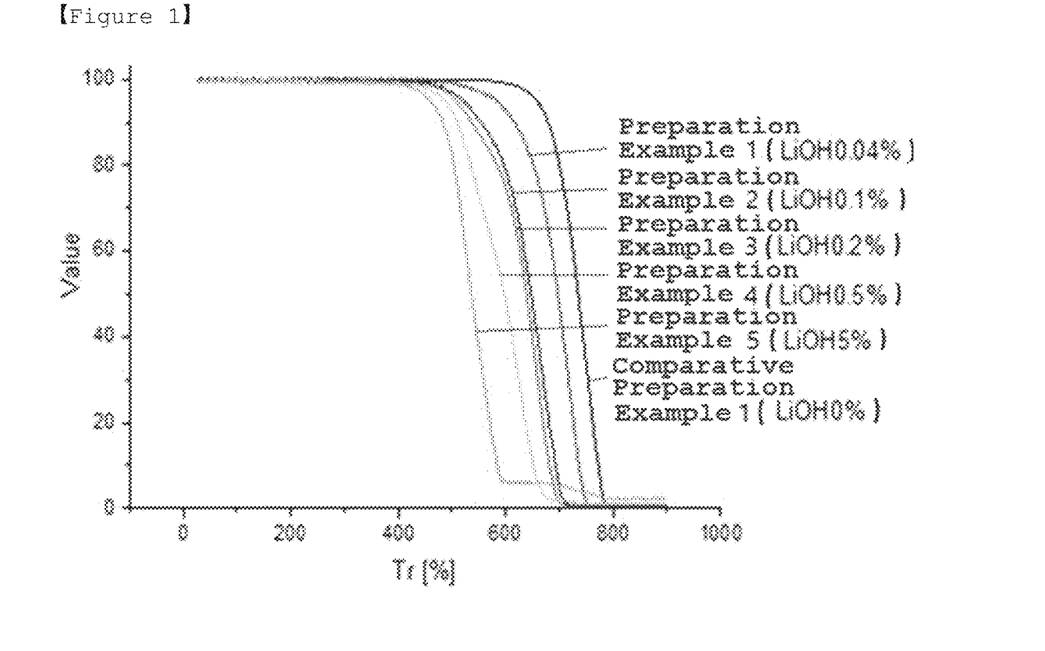
FIGS. 1 and 2 are thermogravimetric analysis (TGA) graphs of LiOH-impregnated carbon nanotubes (CNT) prepared in Preparation Examples 1 to 5 (Experimental Example 1).
Figure 2:
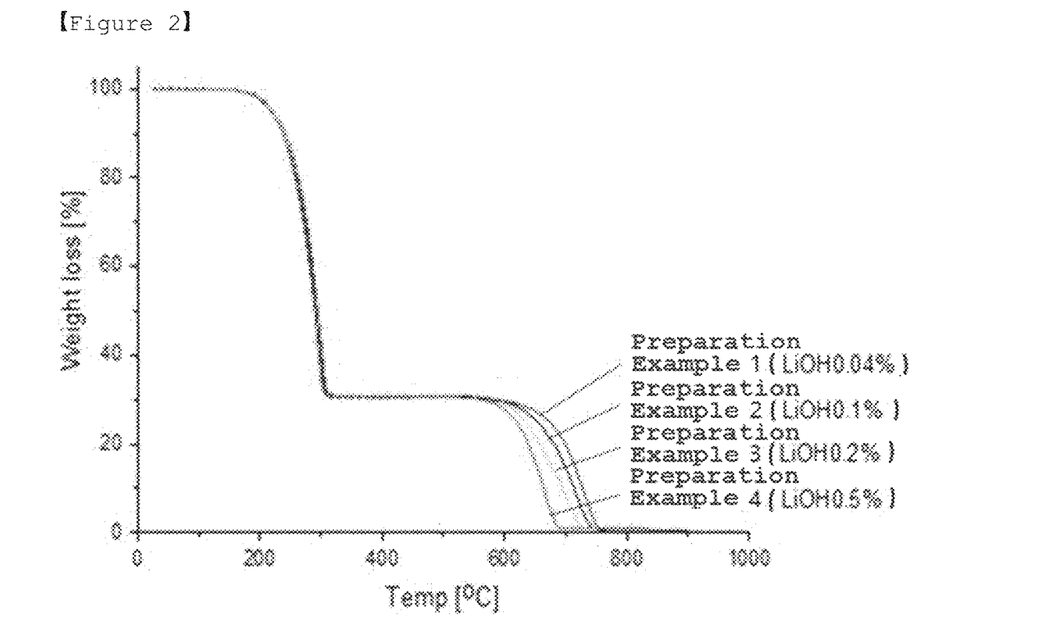

The experimental results are shown in FIGS. 1 and 2. As confirmed from FIGS. 1 and 2, it was confirmed that as the LiOH content is increased, the decomposition temperature of LiOH impregnated CNT is lowered.

In addition, after impregnating S again in LiOH-impregnated CNT, it was confirmed by analyzing the S content by TGA that S contents are equally present at 70% by weight in all the prepared samples.

Experimental Example 2: Evaluation of Battery Performance

The performance of the batteries prepared in Examples 9 and 10 and Comparative Example 2 was evaluated. After 2.5 cycles of initial discharging-charging-discharging-charging-discharging at 0.1 C rate and then 3 cycles of charging-discharging at 0.2 C rate, the battery performance was evaluated by charging at 0.3 C rate and discharging at 0.5 C rate up to 120 cycles.

Figure 3:
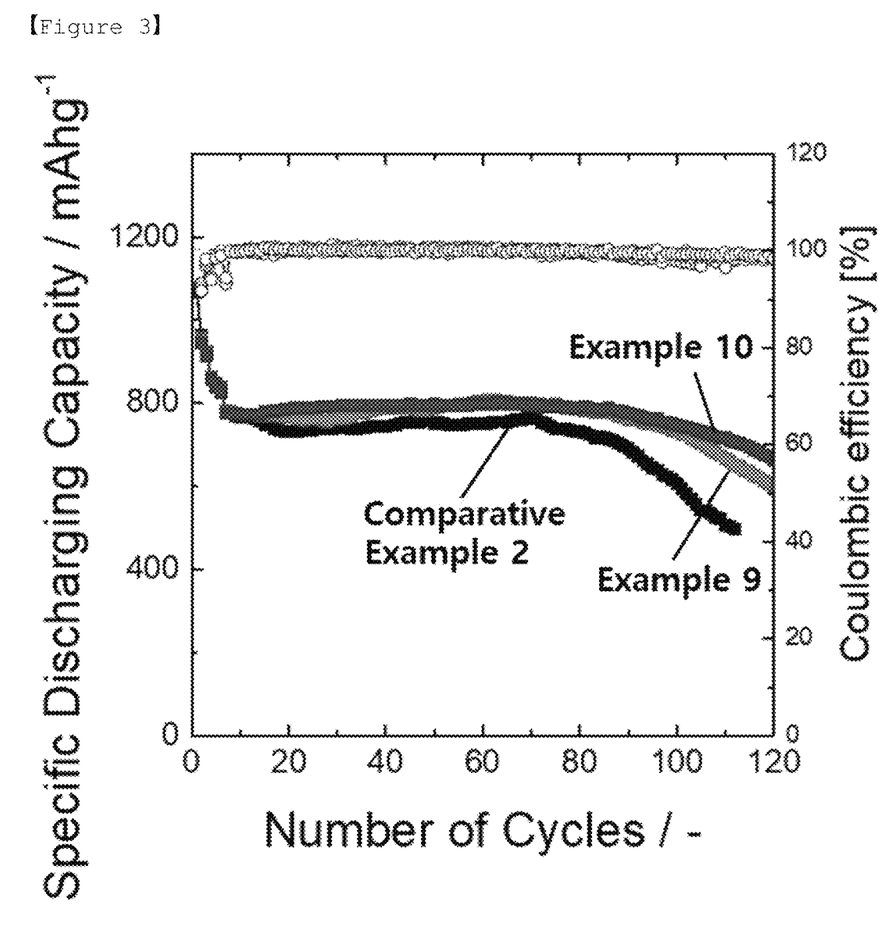
FIG. 3 is a graph showing the results of evaluating the cycle life characteristics of the batteries prepared in Examples 9 to 10 and Comparative Example 2 (Experimental Example 2).

The results of the evaluation are shown in FIG. 3.

As shown in FIG. 3, the lithium secondary batteries of Examples 9 and 10 using positive electrodes for lithium secondary batteries containing LiOH showed a significantly improved cycle lifetime as compared to the case of using the positive electrode for the lithium secondary battery without LiOH of Comparative Example 2.

The invention claimed is:

1. An electrode for a lithium secondary battery comprising: LiOH,
wherein the electrode is a positive electrode for a lithium-sulfur battery,
wherein the positive electrode comprises a sulfur-carbon composite active material,
wherein the sulfur-carbon composite active material comprises carbon nanotubes and elemental sulfur,
wherein the carbon nanotubes and sulfur are mixed in a weight ratio of 1:1 to 1:9,
wherein the sulfur-carbon composite active material is prepared by heat-treating a mixture of LiOH-impregnated carbon nanotubes and elemental sulfur at a temperature of 120 to 200° C., and
wherein LiOH is present in an amount of 0.06 parts by weight to 0.15 parts by weight based on 100 parts by weight of active material.

2. A lithium secondary battery comprising the electrode of claim 1.

3. The lithium secondary battery according to claim 2, wherein the battery is a lithium-sulfur battery.

* * * * *